April 25, 1944.   F. T. HARRINGTON ET AL   2,347,261
POWER TRANSMISSION
Original Filed Oct. 12, 1937   3 Sheets-Sheet 1

INVENTORS
FERRIS T. HARRINGTON,
L. RAYMOND TWYMAN &
JAMES ROBINSON
BY *Ralph L. Tweedale*
ATTORNEY

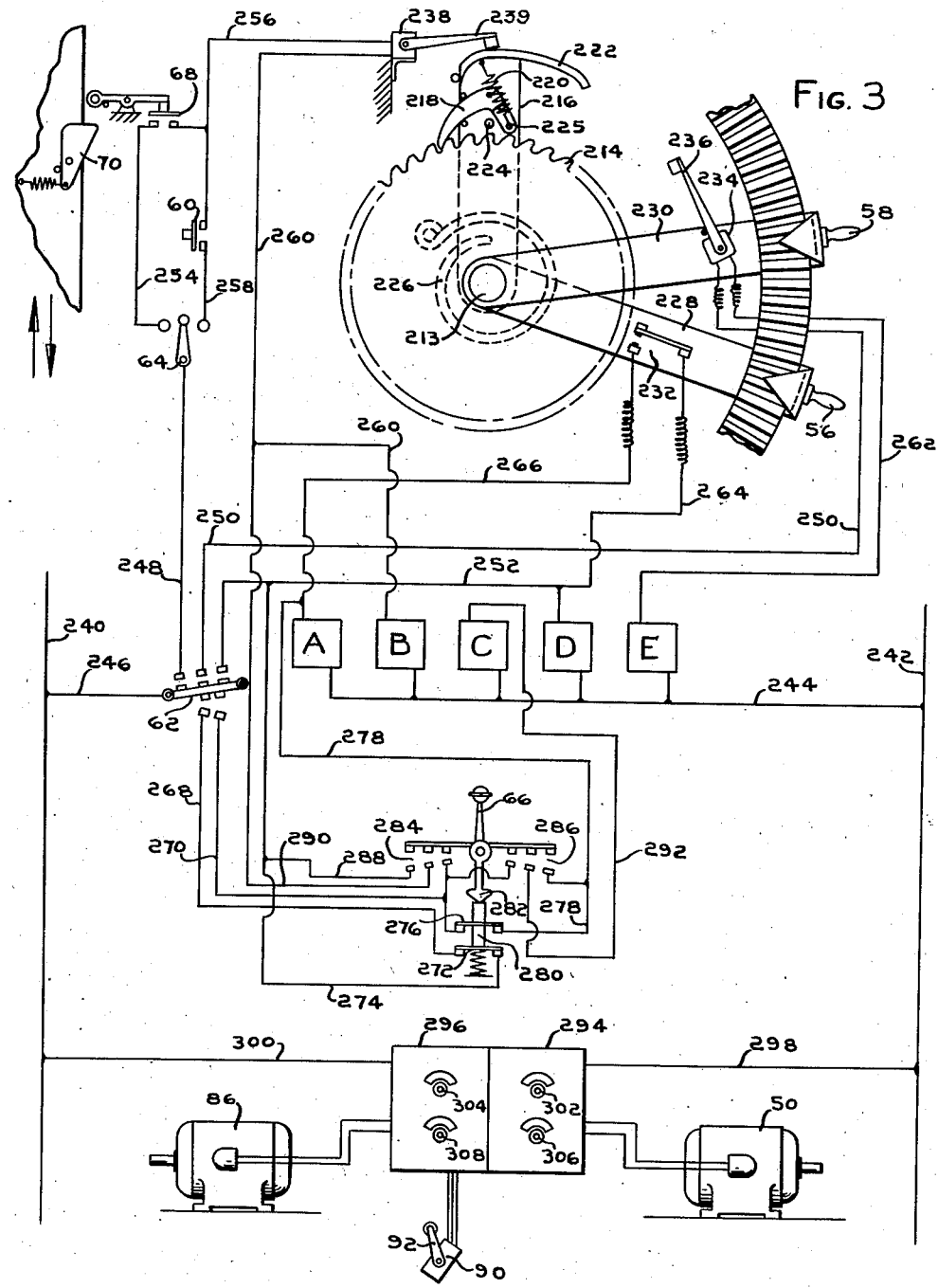

Patented Apr. 25, 1944

2,347,261

UNITED STATES PATENT OFFICE 2,347,261

POWER TRANSMISSION

Ferris T. Harrington, L Raymond Twyman, and James Robinson, Detroit, Mich., assignors to Vickers Incorporated, Detroit, Mich., a corporation of Michigan Original application October 12, 1937, Serial No. 168,618, now Patent No. 2,203,354, dated June 4, 1940. Divided and this application September 23, 1939, Serial No. 296,200

6 Claims. (Cl. 60—53)

This invention relates to power transmissions and more particularly to those of the type comprising two or more fluid pressure energy translating devices, one of which may function as a pump and another as a fluid motor. The invention is shown and described as embodied in a device for feeding strip material intermittently to a blanking press, although it will be understood that this is but one example of many applications to which the present invention is adaptable. This application is a division of application Serial No. 168,618, filed October 12, 1937, now Patent No. 2,203,354, issued June 4, 1940.

It is an object of the present invention to provide a hydraulic power transmission system and control mechanism therefor which may operate a set of pinch rolls for feeding a predetermined length of strip material from a reel into a blanking press. In devices of this character the timing of the strip movement and its acceleration and deceleration must be under accurate control so that exactly the correct length is fed into the press at each operation, and unnecessary waste of material avoided.

It is also an object to provide in devices of the character described means for automatically controlling the speed of a reel so as to operate at a speed which is an average of the intermittent speed of the pinch rolls.

It is a further object to provide a hydraulic transmission system of the type including a pump and a motor wherein a novel arrangement of reversing valves and relief valves is provided which permit utilization of a single relief valve both for safety protection during normal forward or reverse operation and also for use as a brake when the load overhauls the fluid motor during deceleration.

A further object is to provide a hydraulic power transmission system wherein a single pump is utilized both for supplying fluid for driving purposes and also for supplying fluid for control purposes wherein control pressure is made available even during periods when the load is overhauling the fluid motor.

Further objects and advantages of the present invention will be apparent from the following description, reference being had to the accompanying drawings wherein a preferred form of the present invention is clearly shown.

In the drawings:

Figure 3 is a schematic view of the electric circuits incorporated in the feed mechanism of Figure 1.

Figure 1:
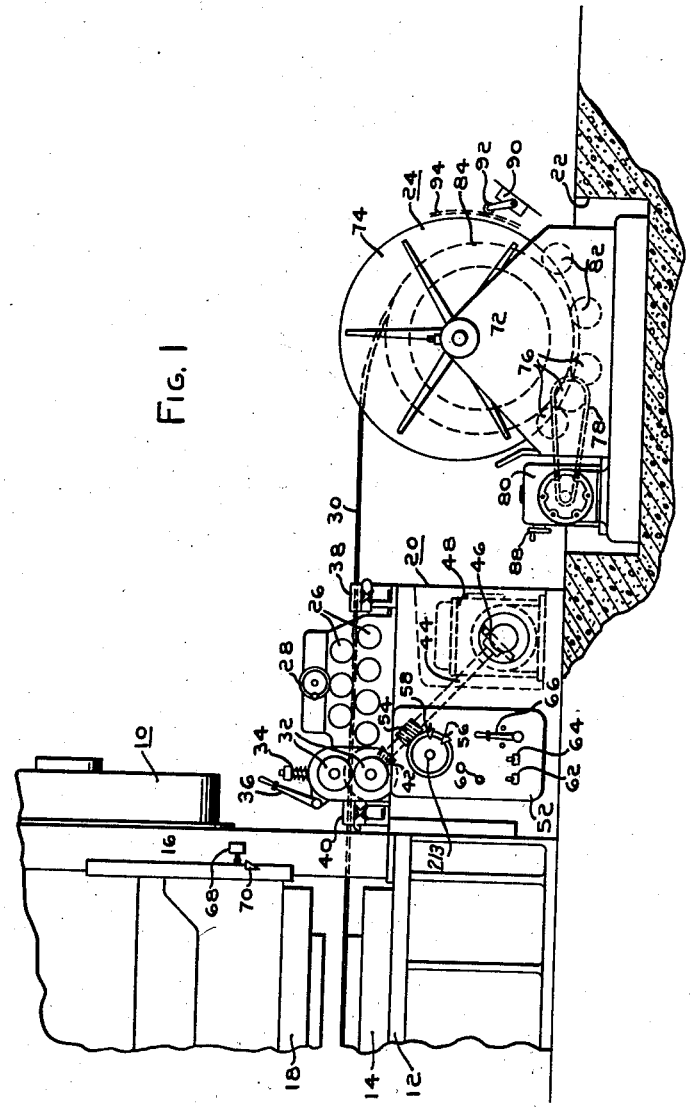
Figure 1 is a fragmentary side view of a blanking press provided with an automatic feed mechanism incorporating a preferred form of the present invention.

Referring now to Figure 1 there is shown a blanking press 10 having a bed 12 carrying a blanking die 14 and a vertically reciprocating slide 16 carrying a blanking punch 18. The construction of the press per se forms no part of the present invention. Positioned at one end of the press is a combined feeding and straightening device 20. Beyond the feeding device 20 there is mounted in a pit 22 a cradle type unreeler 24.

The device 20 includes a series of straightening rolls 26 which may be manually adjusted by handwheel 28 and are operated by frictional contact with the strip 30 which is being unreeled from the device 24. A pair of pinch rolls 32 contact the strip, the upper roll 32 being urged into contact with the strip by an adjustable spring 34, the pressure of which may be manually relieved when necessary by a hand lever 36. Adjustable side guides 38 and 40 position the strip laterally in the rolls 26 and 32. The lower roll 32 is driven by means of bevel gearing 42, shaft 44, and bevel gearing 46 from a hydraulic transmission indicated generally at 48. The latter is driven by an electric motor 50 (see Figure 3).

An electric timing and control panel 52 is mounted in the front wall of the feeding device 20, the timing mechanism thereof being driven by a worm 54 meshing with a worm wheel, not shown. The control panel 52 includes an adjustable pointer 56 for determining the length of strip which is fed in one cycle, an adjustable pointer 58 for determining the point in the cycle at which deceleration is started, a push button switch 60 for initiating a cycle of operation manually, a toggle switch 62 for switching from automatic cyclic operation to inching operation, a toggle switch 64 for switching between manual initiation of cyclic operation and press controlled initiation of cyclic operation, and a control lever 66 for effecting inching forwardly or backwardly when the toggle switch 62 is in inching position. Mounted on the main frame of the press adjacent the slide 16 is a trip switch 68 operable by a flipper cam 70 carried on the slide. The latter closes the switch 68 during the upward stroke of the slide 16 but is ineffective to close switch 68 on the downward stroke. Either the switch 68 or the cam 70 may be vertically adjustable for varying the point in the press cycle at which the switch is closed.

The unreeling device 24 includes a pair of upstanding side frames 72, each of which carries freely rotatable side flanges 74. Mounted between the side frames 72 in an arc along the bottom are a plurality of cradle rolls 76 driven by a chain 78 from a variable speed hydraulic transmission 80. Idler rolls 82 are also mounted between the frames 72 for assisting in positioning a reel of strip material 84. The transmission 80 is driven from an electric motor 86 (shown in Figure 3) and is provided with a handwheel 88 for varying the speed of the cradle rolls 76. A three-way limit switch 90 is mounted adjacent the reel 84 and is provided with an operating lever 92 adapted to be contacted by the strip 30 when a predetermined amount of slack occurs between the unreeling device 24 and the feeding device 20 (see the dotted lines 94).

Figure 2:
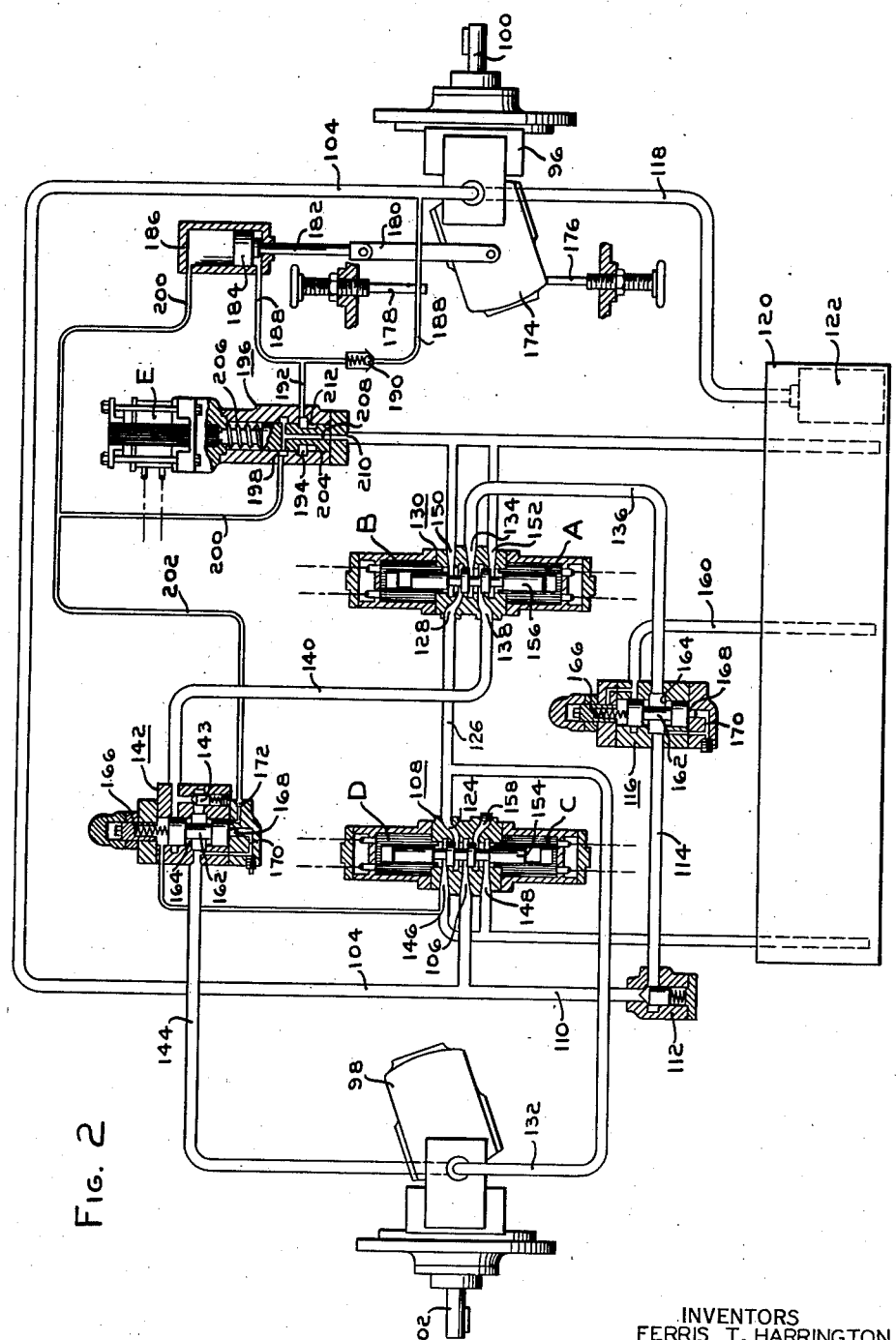
Figure 2 is a schematic view of the hydraulic circuits incorporated in the feed mechanism of Figure 1.

Referring now to Figure 2 the hydraulic circuit of the power transmission 48 is there shown diagrammatically. The transmission comprises essentially a variable stroke pump 96 and a fixed stroke motor 98. The shaft 100 of the pump 96 is driven by motor 50 while the shaft 102 of motor 98 drives bevel gearing 46. The pump 96 and motor 98 may be of any suitable construction and are illustrated as of the type shown in the patent to Hans Thoma, 1,931,969. The pump 96 delivers fluid into a conduit 104 which communicates with a port 106 in a solenoid-operated valve 108. A branch conduit 110 leads to a check valve 112 whence a conduit 114 extends to the pressure side of a relief valve 116. A suction conduit 118 of pump 96 extends into the sump 120 and may be provided with a filter element 122. In the mechanism of Figure 1, the sump 120 is formed within the frame or housing of the feeding device 20. The valve 108 is provided with a port 124 which connects by a conduit 126 with a port 128 in a solenoid-operated four-way valve 130. A branch conduit 132 extends to the motor 98 and forms the delivery conduit thereto when the motor is operating in a forward driving direction. A port 134 of the valve 130 is connected by a conduit 136 to the relief valve 116 at the same point where the conduit 114 connects thereto. A third port 138 of the valve 130 connects by a conduit 140 to the discharge side of a resistance valve 142 whch may be similar in construction to the relief valve 116, but incorporates in addition a check valve 143 opening to flow from conduit 140 to conduit 144. The pressure side of the valve 142 is connected by a conduit 144 to the opposite port of the motor 98.

Suitable exhaust connections 146, 148, 150 and 152 are provided at the ends of the valves 108 and 130. The valves 108 and 130 include spools 154 and 156 which are shiftable to their lower positions by solenoids C and A and to their upper positions by solenoids D and B. When shifted to either position the spools are adapted to remain in that position until positively operated by the opposite solenoid. The valves 108 and 130 may be identical in construction, the valve 108 having a port 158 which is plugged, thus making the valve in effect a three-way valve. The discharge port of the valve 116 connects to the sump by a conduit 160.

Each of the valves 116 and 142 includes a spool 162 reciprocable in a bore 164 and urged downwardly by a spring 166. At the lower end of the spool 162 there is provided a small piston 168 which is subject to pressure at the pressure side of the valve through a small conduit 170. Whenever this pressure exceeds the setting of the spring 166, the valve spool is caused to rise opening communication between the pressure and discharge sides of the valve. The valve 142 is provided with an additional conduit 172 whereby fluid pressure may at times be admitted to the bottom end of the spool 162 for positively lifting the valve regardless of the pressure in the conduit 144.

For the purpose of providing a controlled acceleration and deceleration of the motor, the pump 96 is provided with a swinging yoke 174 the motion of which is limited by adjustable stops 176 and 178. A link 180 connects the yoke 174 to the stem 182 of a piston 184 reciprocable in a cylinder 186. A branch conduit 188 extends from the pressure line 104 through a check valve 190 to the rod end of the cylinder 186. A branch 192 extends to a port 194 of a solenoid-operated three-way pilot valve 196. A port 198 connects by a conduit 200 to the head end of the cylinder 186 and by a branch 202 to the control conduit 172 of the valve 142. A spool 204 of the valve 196 is urged downwardly by a spring 206 but may be lifted by a solenoid E. The spool is provided with a central bore 208 which connects between port 198 and an exhaust port 210 when the spool is in its lower position. A circumferential groove 212 connects the ports 194 and 198 when the spool is in its raised position.

In operation of the hydraulic circuit shown in Figure 2, the pump 96 is operated at constant speed and fluid is delivered to pipe 104 at varying rates depending upon the position of the yoke 174. When the yoke is in its downward position against stop 176, the pump is in maximum stroke position and when it is raised up to the stop 178, the pump is in minimum stroke position which may be very near to its position of zero stroke. If it is desired to operate the motor 98 forwardly with a predetermined acceleration, the solenoids B, D, and E are energized. The spool of the valve 196 is thus lifted admitting pressure fluid through conduit 188, check valve 190, conduit 192, ports 194 and 198, and conduit 200 to the head end of cylinder 186. Due to the greater area at this end of the cylinder, the pressure is able to overcome the force constantly exerted in the rod end of the cylinder and to force yoke 174 downwardly at a speed determined by the resistance of the conduits 188, 192 and 200. Energization of the solenoid E also admits fluid to conduit 172 of the valve 142 causing the spool 162 to lift and open communication between conduits 144 and 140. With solenoid B energized, spool 156 is lifted, connecting port 128 to port 134, and port 138 to exhaust port 152. With solenoid D energized spool 154 is lifted connecting port 106 with port 124.

Fluid is accordingly withdrawn by the pump 96 from the sump through conduit 118 and delivered through conduit 104, port 106, port 124 conduit 126 and branch conduit 132 to motor 98. Fluid returns from the motor 98 through conduit 144, valve 142, conduit 140, port 138, port 152 to the sump. The motor 98 is thus caused to operate at a speed which increases proportionally to the movement of yoke 174 downwardly until, when the latter reaches the stop 176, the motor 98 is operating at full speed and continues to so operate so long as the solenoid E is energized and neither solenoid A or C is energized. It will be noted that under these conditions the pressure line between the pump and the motor is connected to the relief valve 116 from conduit 126 through port 128, port 134 and conduit 136. Should the pressure rise above a safe value, valve 116 opens permitting bypassing to the sump until the pressure falls to a safe value.

When it is desired to decelerate the motor 98, solenoid E is deenergized thus permitting spool 204 to drop under the urge of spring 206 and connecting the head end of cylinder 186 to the sump through conduit 200, port 198, bore 208 and port 210. The pressure constantly exerted in the rod end of cylinder 186 is then able to lift the piston, returning yoke 174 to its minimum stroke position at a rate determined by the resistance of the conduit 188. Shifting of the spool 204 also exhausts fluid from under the spool 162 of valve 142 so that the latter tends to close until sufficient pressure is built up in conduit 144 to overcome the force of spring 166. The valve 142 is preferably adjusted so that the pressure in conduit 144 required to open the same under these conditions is comparatively small but sufficient to create a back pressure not only in pipe 144 but also in the pressure side of the system including conduits 132 and 104. It is thus insured that pressure is available in the branch conduit 188 even though the load which is connected to shaft 102 may tend to overhaul the motor 98. The motor 98 is thus caused to slow down at a predetermined rate until its minimum speed is reached when the yoke 174 strikes the abutment 178.

Thereafter if it is desired to stop the motor 98, the solenoid A may be energized shifting the spool 156 downwardly. This connects the return conduit 140 through ports 138 and 134, and conduit 136 to the relief valve 116. The motor is thus caused to stop almost instantly because of the high pressure required to force fluid through the relief valve 116. Thus the valve 116, which during forward operation functioned merely as a safety valve on the pressure side of the system, is now connected to the return side in such a manner as to act as a brake on the motor 98. The shifting of the spool 156 also connects port 128 to exhaust port 150 thus bypassing the pump 96 through conduit 104, ports 106 and 124, conduit 126, ports 128 and 150. Check valve 112 prevents fluid pressure built up in conduit 136 from reaching the sump through conduit 114, conduit 110, ports 106 and 124, conduit 125 and ports 128 and 150 under these conditions.

If it is desired to operate the motor reversely, solenoids A and C may be energized thus shifting both spools 154 and 156 to their lower position. Under these conditions fluid is delivered from the pump 96 through conduit 104, branch 110, check valve 112, conduit 114, relief valve 116, conduit 136, port 134, port 138, conduit 140, check valve 143, and conduit 144 to the motor 98. Fluid expelled by the motor is delivered through conduit 132, conduit 126, and jointly through port 128, and port 150 as well as through ports 124 and 146 to the sump. The solenoid E may be energized concurrently with energization of the solenoids A and C although for operation of the strip feeding device disclosed in Figure 1 it is never necessary or desirable to drive the pinch rolls backwardly beyond the minimum reeling speed. It will be noted that during reverse operation the relief valve 116 remains in communication with the high pressure side of the circuit through the branch conduit 114. To stop reverse motion of the motor 98, solenoids A and D are energized causing stoppage in the manner previously described, except that no breaking effect is produced. The pump is thus bypassed through conduit 104 and ports 106, 124, 128 and 150 while the motor is free to deliver oil through conduits 132 and 126, and ports 128 and 150 to tank. While it is coasting it may draw in oil from the supply line 104 through check valve 112, conduits 114 and 136, ports 134 and 138 and conduits 140 and 144.

For the purpose of automatically controlling energization of solenoids A, B, C, D, and E the control panel 52 is provided which is illustrated diagrammatically in Figure 3. The timing mechanism which is driven from the worm 54 includes a timer shaft 213, upon which a ratchet wheel 214 is rigidly secured so that the latter turns clockwise whenever the pinch rolls are operated in a forward direction; that is, to feed the strip 30 into the press. Freely rotatable on the timer shaft 213 behind wheel 214 is an arm 216 carrying a pivoted pawl 218 which is snap-acting by means of an over-center spring 220. The arm 216 also carries an upstanding cam surface 222 for operation of certain switch levers later to be described. In the position shown in Figure 3 the pawl 218 has been snapped over to its counterclockwise position by means of a fixed pin 224 which projects from the front wall of the timer mechanism into the path of the tail portion 225 of the pawl 218. A spiral spring 226 constantly urges the lever 216 into the position shown in Figure 3. The spring 226 may be overcome by operation of the ratchet wheel 214 in a clockwise direction when pawl 218 is engaged with the teeth thereof. Freely rotatable on the timer shaft 213 on the near side of the wheel 214 are two adjustable arms 228 and 230 upon which the adjustable pointers 56 and 58 are carried. The arm 228 carries a normally open switch 232 which is adapted to lie in the path of the tail 225 of the pawl 218 whereby the switch may be closed when arm 216 has been carried around to the arm 228 and whereby also the pawl 218 may be snapped over to disengage the pawl from the ratchet wheel 214. The arm 230 carries a normally closed switch 234 having an operating arm 236 engageable by the cam 222 after a predetermined arc of movement of the arm 216. Mounted on a stationary part of the mechanism is a normally open switch 238 having an operating arm 239 adapted to be engaged by the cam 222 to close the switch when the arm 216 is in the normal or starting position shown in Figure 3.

The two sides of an electric supply circuit are indicated at 240 and 242. The line 242 is connected by a conductor 244 to one side of each of the solenoids A, B, C, D and E. The line 240 is connected by a conductor 246 to the arm of the toggle switch 62. When the switch 62 is in its upper position, that is, the position for cyclic operation, the line 246 is connected to conductors 248, 250 and 252. Conductor 248 leads to the arm of toggle switch 64 which is shiftable for press initiated or hand initiated cycles. In its left-hand position in Figure 3, the switch 64 connects conductor 248 to a conductor 254 leading to the switch 68 from which a conductor 256 leads to one side of the switch 238. In its right-hand position the switch 64 connects conductor 248 to a conductor 258 leading to push button switch 68, the opposite side of which is connected to the conductor 256. Switch 238 is also connected by a conductor 260 to one side of solenoid B. The conductor 250 extends to one side of the switch 234, the opposite side of which is connected by conductor 262 to solenoid E. The conductor 252 extends to the solenoid D and has a branch conductor 264 extending to one side of the switch 232, the opposite side of which is connected by a conductor 266 to the solenoid A.

When the switch 62 is in its lower position, that is, the position for inching operation, conductor 246 is connected to conductors 268 and 270. Conductor 268 extends to a switch 272, the other side of which is connected by a conductor 274 to the conductor 252. Conductor 270 is connected to a switch 276, the other side of which is connected by a conductor 278 to the solenoid A. The switches 272 and 276 are mounted on a common insulating stem 280 which is operable to be depressed to switch closing position by a cam 282 whenever the lever 66 is in its central position, to which the same is normally biased by centering springs, not shown. The lever 66 also controls two inching switches 284 and 286 which are closed when the lever 66 is moved to the left or right respectively. Switches 272 and 276 are opened by cam 282 before either switch 284 or switch 286 is closed. When switch 284 is closed, connection is established with the line 240 through conductor 246, switch 62, and conductor 270 with a pair of conductors 288 and 290. Conductor 288 connects to conductor 274 leading to conductor 252 and solenoid D. Conductor 290 connects with conductor 260 and solenoid B. When switch 286 is closed, a line connection is established from conductor 270 to conductor 278 and to a conductor 292 which connects with solenoid C.

A pair of conventional motor starting controllers 294 and 296 are connected in parallel across the lines 242 and 240 by conductors 298 and 300. The controllers 294 and 296 may be of the magnetically operable type having starting push buttons 302 and 304 which energize the magnetic operating mechanism, and stop push buttons 306 and 308 which break the holding circuit for the magnetic operating mechanism. The three-way limit switch 90 is connected to the starting controller 296 in a manner to break the holding circuit when the lever 92 is moved clockwise by contact with the strip material and to make the starting magnet circuit when the lever 92 returns to normal position.

In operation of the device as a whole a reel of material 84 may be placed on the cradle rolls 76 and 82 between the side flanges 74 and the end of the material fed through the straightening rolls 26 and the pinch rolls 32. With the switch 62 in inching position, lever 66 may be operated to the left opening switches 272 and 276 and closing switch 284. Solenoids B and D are thereby energized, the circuit for the solenoid B being from line 240, conductor 246, switch 62, conductor 270, switch 284, conductors 290 and 260 through solenoid B and conductor 244 to the return line 242. The circuit for solenoid D is the same as far as switch 284 and thence by conductors 288 and 252 through solenoid D and conductor 244 to the line 242. With solenoids B and D energized the motor 98 is caused to operate in a forward direction at minimum speed as previously described, driving the pinch rolls 32 and feeding the strip into the press.

When it is desired to stop the forward motion of the strip 30, lever 66 may be moved to mid-position, opening switch 284 and closing switches 272 and 276. Solenoids A and D are thereby energized, the circuit for solenoid A being through conductor 246, switch 62, conductor 270, switch 276 and conductor 278 through solenoid A, and conductor 244 to the line 242. The circuit for solenoid D is from switch 62 through conductor 268, switch 272, conductors 274 and 252 through solenoid D and conductor 244 to line 242. With the solenoids A and D energized the motor is caused to stop.

If the strip 30 has been fed too far before stopping, the lever 66 may be moved to the right opening switches 272 and 276 and closing switch 286. Solenoids A and C are thereby energized, the circuit for solenoid A being from line 240 through conductor 246, switch 62, conductor 270, switch 286, conductor 278, solenoid A, and conductor 244 to the line 242. The circuit for solenoid C is the same as far as switch 286 and thence through conductor 292, solenoid C and conductor 244 to the line 242. The motor 98 is thereby caused to operate reversely at a minimum speed until the lever 66 is again returned to mid-position when the motor is stopped as previously described.

If it is desired to feed the strip 30 into the press in an automatic cycle of predetermined length, the toggle switch 62 is shifted upwardly in Fig. 3 and with the switch 64 in its right-hand or hand-initiation position, the push button 60 may be depressed to cause a cycle of automatic operation. With arm 216 in its starting position, as shown in Figure 3, closing of switch 60 energizes solenoid B from line 240 through conductor 246, switch 62, conductor 248, switch 64, conductor 258, switch 60, conductor 256, switch 238, conductor 260, solenoid B and conductor 244 to line 242. The solenoid D is energized from line 240 through conductor 246, switch 62, conductor 252, solenoid D and conductor 244 to line 242. The solenoid E is energized from line 240 through conductor 246, switch 62, conductor 250, switch 234, conductor 262, solenoid E and conductor 244 to line 242. The motor 98 is thereby caused to operate forwardly with a predetermined acceleration as previously described thus causing the strip 30 to feed into the press at a gradually increasing rate of speed. As the feed rolls 32 turn, the timer shaft 213 which carries ratchet wheel 214, is also caused to turn clockwise carrying with it the arm 216. After the pinch rolls 32 have reached their maximum speed, or possibly even before this speed is reached, cam 222 engages arm 236 opening switch 234 and deenergizing the solenoid E. The motor 98 is thereby caused to decelerate, slowing down the strip 30 in its forward movement into the press. At about the time that minimum speed is reached, the arm 216 reaches a position where the tail 225 of pawl 218 abuts the switch 232, closing the same and snapping the pawl 218 out of engagement with the ratchet wheel 214. Closure of switch 232 energizes solenoid A from line 240 through conductor 246, switch 62, conductors 252 and 264, switch 232, conductor 266, solenoid A and conductor 244 to the line 242. The solenoid D remaining energized, the motor 98 is thereby brought to a quick stop through the braking action previously described. The spring 226 in the meantime returns arm 216 to starting position and the mechanism is ready for a second operation whenever the push button 60 is depressed.

For automatic press-initiated operation of the feeding device, switch 64 is shifted to its left-hand position in Figure 3 and reel driving motor 50 is started. The variable speed transmission 80 is adjusted to a speed somewhat greater than the average speed of the strip 30 through the device 20 and before the press 10 is started, the unreeling device will operate to unreel the strip 30 until the switch 92 is contacted, thus stopping the motor 50. Thereafter the press 10 may be started and as the slide 16 returns on its upward stroke, cam 70 trips the switch 68 which initiates a cycle of operation in exactly the same manner as was initiated by manual operation of the switch 60. The speed of the press is of course so correlated with the speed of operation of the feeding device 20 that the required length of strip may be fed into the press during the interval while the dies are open.

For maximum flexibility and usefulness with various sets of dies in the press 10, it is necessary that the length of strip which is fed at one cycle be capable of convenient adjustment. This is provided by the adjustable arms 228 and 230 which are operable from the front of the control panel 52 by setting the pointers 56 and 58. The two pointers 56 and 58 are preferably kept a fixed distance apart which distance is such that the deceleration of motor 98 is just completed at the time the pawl 218 closes the switch 232. This distance should of course be varied whenever adjustments are made at the stops 176 and 178, requiring a greater or less time for the yoke 174 to swing between the stops.

While the form of embodiment of the invention as herein disclosed constitutes a preferred form, it is to be understood that other forms might be adopted, all coming within the scope of the claims which follow.

What is claimed is as follows:

1. In a hydraulic power transmission system the combination of a pump, a fluid motor, a fluid circuit connecting the pump and motor, said circuit including a pair of directional control valves and a relief valve, said directional control valves being shiftable to form within the circuit supply and return connections for both forward and reverse operation of the motor as well as connections to resist return flow from the motor and simultaneously to dump fluid supplied by the pump, said relief valve being so connected as to be in communication with the supply line for forward and reverse flow to the motor and to be in communication with the return line when the flow therein is resisted.

2. In a hydraulic power transmission system the combination of a pump with an inlet sump tank, a fluid motor, a fluid circuit connecting the pump, motor and tank, said circuit including a relief valve connected to relieve fluid to the tank exclusively, and selector valve means for either connecting the motor to the pump with the relief valve in communication with the pump delivery or blocking the return flow from the motor with the relief valve in communication with the return side of the motor.

3. In a hydraulic power transmission system the combination of a pump with an inlet sump tank, a fluid motor, a fluid circuit connecting the pump, motor and tank, said circuit including a relief valve connected to relieve fluid to the tank exclusively, and selector valve means for either connecting the motor to the pump with the relief valve in communication with the pump delivery or resisting the return flow from the motor and by-passing the pump with the relief valve in communication with the return side of the motor.

4. In a hydraulic power transmission system the combination of a pump and a rotary fluid motor for accelerating, driving and decelerating a load device, one of which includes means for varying the displacement thereof, a second fluid motor for operating the displacement varying means, supply and return conduits connecting the pump and the first motor, the return conduit leading to a point at atmospheric pressure, a control valve for selectively operating the second fluid motor by fluid from the supply conduit, and a resistance valve in the return line for creating back pressure in the supply line for operating the second fluid motor when the load device is overhauling the first motor during deceleration.

5. In a hydraulic power transmission system the combination of a pump and a rotary fluid motor for accelerating, driving and decelerating a load device, one of which includes means for varying the displacement thereof, a second fluid motor for operating the displacement varying means, supply and return conduits connecting the pump and the first motor, the return conduit leading to a point at atmospheric pressure, a control valve for selectively operating the second fluid motor by fluid from the supply conduit, and a resistance valve in the return line for creating back pressure in the supply line for operating the second fluid motor when the load device is overhauling the first motor during deceleration, and means for providing an unrestricted return path from the first motor to the pump when the motor is not being decelerated.

6. In a hydraulic power transmission system the combination of a pump and a rotary fluid motor for accelerating, driving and decelerating a load device, one of which includes means for varying the displacement thereof, a second fluid motor for operating the displacement varying means, supply and return conduits connecting the pump and the first motor, the return conduit leading to a point at atmospheric pressure, means for reversing the flow of fluid between the pump and motor, a control valve for selectively operating the second fluid motor by fluid from the supply conduit, a resistance valve in the return line for creating back pressure in the supply line for operating the second fluid motor when the load device is overhauling the first motor during deceleration, and means for bypassing the resistance valve upon reversed flow in the return conduit.

FERRIS T. HARRINGTON.
L RAYMOND TWYMAN.
JAMES ROBINSON.